United States Patent [19]
Peters

[11] 3,987,817
[45] Oct. 26, 1976

[54] TEST VALVE FOR FLUID ACTUATED PILOT VALVE

[75] Inventor: Clifford M. Peters, Longview, Tex.

[73] Assignee: ACF Industries, Incorporated, New York, N.Y.

[22] Filed: Dec. 24, 1975

[21] Appl. No.: 643,968

[52] U.S. Cl. ............................. 137/625.4; 73/4 R; 137/458
[51] Int. Cl.² ....................................... G01L 27/00
[58] Field of Search ................ 137/607, 625.4, 239, 137/240, 458; 73/4 R; 251/149.6, 149.7

[56] References Cited

UNITED STATES PATENTS

| | | | |
|---|---|---|---|
| 2,548,957 | 4/1951 | DiRosa | 137/239 |
| 3,049,148 | 8/1962 | Richardson | 73/4 R |
| 3,817,282 | 6/1974 | Peters | 137/607 |
| 3,927,553 | 12/1975 | Frantz | 73/4 R |

*Primary Examiner*—Robert G. Nilson
*Attorney, Agent, or Firm*—Eugene N. Riddle

[57] ABSTRACT

A test valve is positioned to block off a primary fluid pressure source acting on a pilot valve means and to provide communication with an alternate test fluid pressure source for testing the pilot valve means. The test valve has a central bore in which a depressible plunger is positioned for longitudinal movement between a seated extended position blocking the primary fluid pressure source and simultaneously communicating test fluid to pilot valve means, and an unseated retracted position in which the alternate fluid pressure source is sealed and blocked by an annular sealing member. The plunger has the annular sealing member adjacent its inner end in sealing contact with the adjacent surface forming the bore and positioned inwardly of a discharge passage in the plunger for the alternate fluid source. A hollow detachable stinger member which seats the plunger provides the test fluid and has a manual control thereon which selectively supplies the test fluid to the test valve.

4 Claims, 6 Drawing Figures

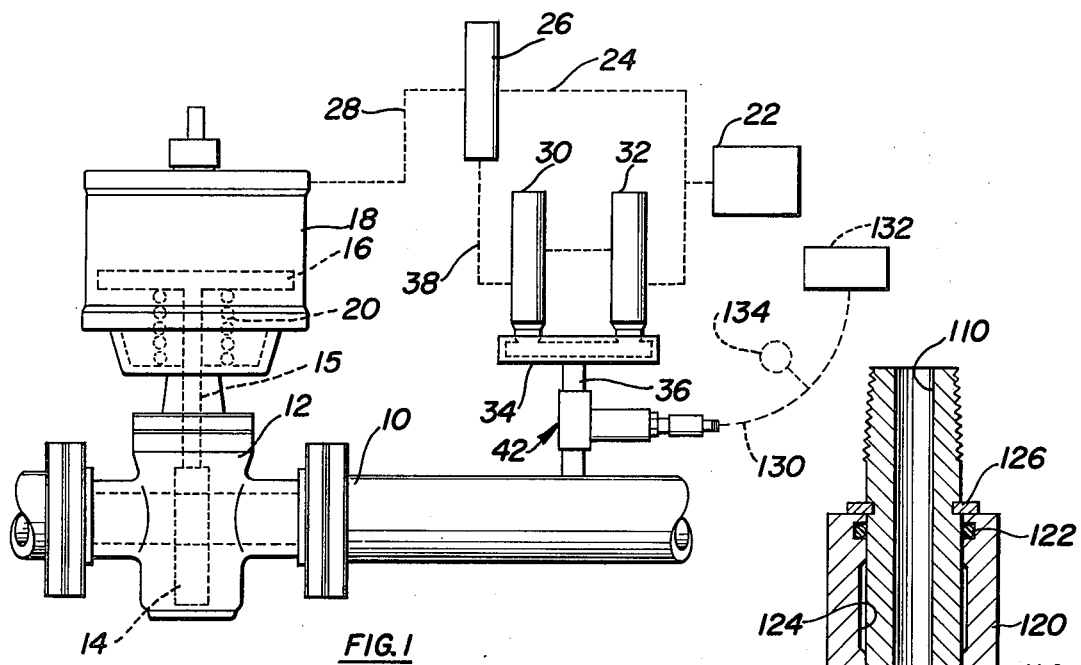
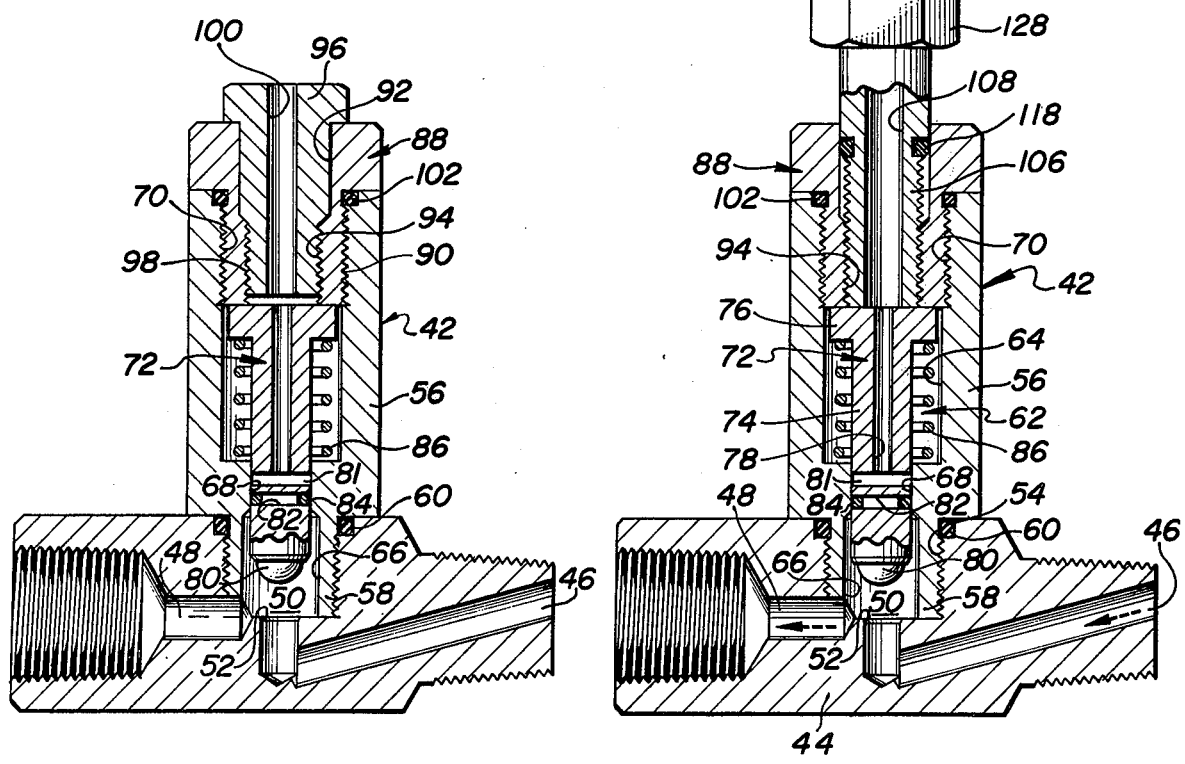
FIG.1
FIG.3
FIG.2

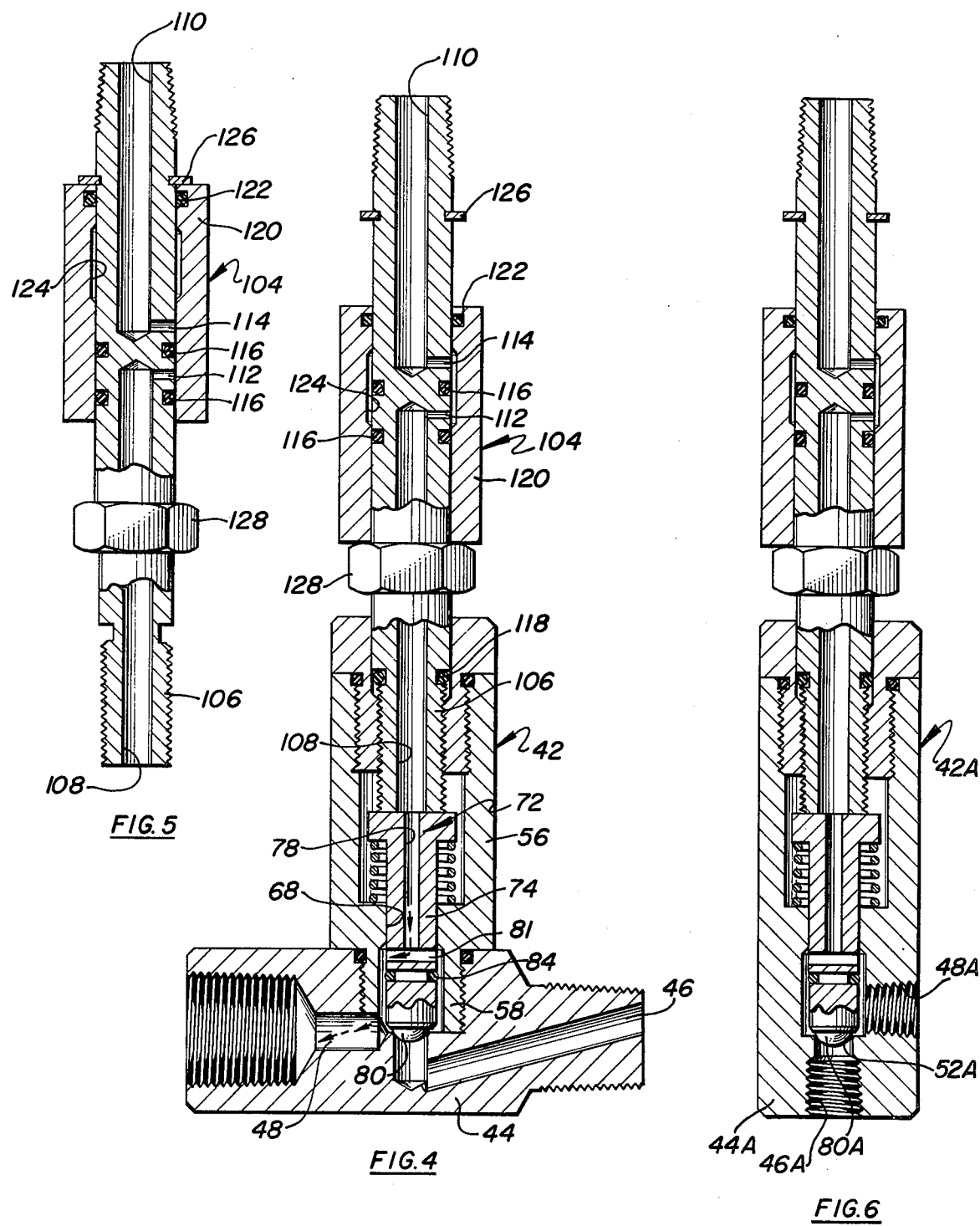

3,987,817

TEST VALVE FOR FLUID ACTUATED PILOT VALVE

BACKGROUND OF THE INVENTION

Heretofore, such as shown in U.S. Pat. No. 3,817,282, dated June 18, 1974, a test valve has been provided for communicating an alternate test fluid source with a valve means to be tested. However, such a test valve heretofore employed a spring loaded check valve to close the alternate fluid passage to fluid pressure from the primary pressure source. A detachable stinger was employed heretofore to open the check valve and to hold the check valve in an open position as long as the stinger was inserted within the housing of the test valve. The employment of a separate check valve in such a test valve arrangement necessitates a relatively large number of elements and the test valve at times can be subject to malfunctioning.

BRIEF DESCRIPTION OF THE INVENTION

This invention is directed to a test valve arrangement which elimates the necessity of a separate check valve element. The test valve employs a plunger mounted within a housing and moved by a hollow stinger inserted within the central bore of the housing into a seated projected position blocking the flow of fluid from a primary pressure source. The housing bore has inner and outer large diameter end portions connected by a restricted small diameter intermediate portion. A spring in the outer end portion of the housing bore continuously urges the plunger to a retracted position. The plunger has a valve element on its inner end and a central fluid passage for the alternate fluid pressure source which has a discharge port or passage adjacent the valve element. An annular sealing member is positioned about the circumference of the plunger between the discharge port and the valve element, and in the unseated retracted position of the plunger, is in sealing contact with the adjacent surface forming the intermediate bore of the housing. When the plunger and valve element thereon are in a seated position, the annular sealing member and the discharge passage are positioned within the large diameter inner end portion of the housing bore and the sealing member is thus removed from sealing relation. In this position, the alternate test fluid source is discharged within the fluid passage to the pilot valve means to be tested. The hollow stinger is connected to an alternate test fluid source and has a manually operated control thereon which is selectively movable between open and closed positions for connecting the supply of the alternate test fluid.

DESCRIPTION OF DRAWINGS

Two embodiments of the invention are illustrated and shown in the accompanying drawings, forming a part of this specification wherein:

FIG. 1 is a schematic, illustrating one embodiment of the invention arranged in a system to control the opening and closing of a gate valve in a main flow passage;

FIG. 2 is an enlarged sectional view of the test valve shown in FIG. 1 removed from the system and having the detachable stinger connected thereto;

FIG. 3 is a sectional view similar to FIG. 2 but showing the stinger for inserting the test fluid removed from the test valve structure with an end plug positioned in the test valve housing in place of the stinger;

FIG. 4 is a sectional view similar to FIG. 2 but showing the stinger of FIG. 2 screwed down with the valve element seated and blocking the flow of fluid from the primary fluid pressure source to permit discharging a test fluid into the system for testing of the pilot valve;

FIG. 5 is a sectional view of the stinger shown removed from the test valve; and FIG. 6 is a sectional view of a further embodiment of the test valve of this invention in which the body of the test valve has inlet and outlet passages therein arranged in a generally right angular relation to each other.

Referring now to the drawings for better understanding of this invention, and more particularly to FIG. 1 in which the test valve of the present invention is shown arranged in a safety system for closing a valve, a conduit is shown generally at 10 having a main flow passage therein for a primary fluid pressure source. A gate valve shown at 12 has a gate valve member 14 therein positioned for movement between open and closed positions relative to the flow passage of conduit 10. A stem 15 has its lower end connected to gate valve member 14 and its upper end connected to a piston 16 mounted within a cylinder 18. A spring 20 continuously urges piston 16 toward the closed position of gate valve member 14. A reservoir 22 supplies fluid through line 24, a by-pass valve 26, and line 28 to cylinder 18 to move piston 16 to an open position of gate valve member 14.

The pilot valves to be tested comprise a low pressure pilot valve 30 and a high pressure pilot valve 32 which are mounted on a base or manifold 34. Flow line pressure is transmitted from conduit 10 through line 36 to manifold 34 in fluid communication with low pressure pilot valve 30 and high pressure pilot valve 32. Low pressure and high pressure pilot valves 30 and 32 are in a normally open position and in this position fluid is supplied from reservoir 22 to cylinder 18 to maintain piston 16 in the down position as shown in FIG. 1. Low pressure pilot valve 30 and high pressure pilot valve 32 are maintained in open position in a fluid pressure operating range which may be predetermined. Upon the reaching of a predetermined low pressure, low pressure pilot 30 will move to a closed position to exhaust the fluid to atmosphere from line 38 leading to by-pass pilot 26 which results in the bleeding of fluid pressure from cylinder 18 to permit gate valve member 14 to move to a closed position under the bias of spring 20. Likewise, when a predetermined high fluid pressure is reached in conduit 10, high pressure pilot 32 moves to a closed position to exhaust the fluid to atmosphere likewise resulting in the movement of gate valve member 14 to a closed position. For further details of the operation of pilot valves 30 and 32, reference is made to U.S. Pat. No. 3,043,331, the entire disclosure of which is incorporated by this reference.

Periodically, it is necessary to check low pressure pilot valve 30 to determine if the low pressure pilot valve will move to a closed position upon the reaching of a predetermined low pressure. Likewise, it is necessary periodically to test high pressure pilot valve 32 to determine if pilot valve 32 will move to a closed position upon the reaching of a certain predetermined high fluid pressure. For testing pilot valves 30 and 32, a test valve structure indicated generally by numeral 42 is connected in line 36. Test valve structure 42 includes a body 44 having an inlet flow line passage 46 therein in communication with the fluid pressure in conduit 10 to provide a first primary fluid pressure source. An outlet passage 48 is provided at an outlet end of body 44 and a valve chamber 50 is arranged between inlet passage 46 and outlet passage 48. Outlet passage 48 leads to manifold 34 to communicate fluid pressure from conduit 10 to both pilot valves 30 and 32. A valve seat 52 is provided in valve chamber 50.

Body 44 has an internally threaded opening 54 and an elongate housing 56 has an externally threaded end 58 which is threaded within internal threaded opening 54. An annular sealing member 60 seals between housing 56 and body 44. Housing 56 has a central bore generally indicated at 62 forming an enlarged diameter outer end portion 64, an inner enlarged diameter portion 66, connected by an intermediate bore portion 68 of a restricted or small diameter. The outer end of outer enlarged bore portion 64 is threaded internally at 70. Fitting within bore 62 is a plunger generally indicated at 72 and comprising a cylindrical body 74 having an outer flange 76. Plunger 72 has a central bore 78 therein and a laterally extending discharge port or passage 81 communicating with central bore 78. A valve 80 is provided on the inner end of plunger 72 and an annular groove 82 receives an annular O-ring 84 therein for sealing between plunger 72 and the surface defining the restricted diameter immediate bore portion 68 at a position between valve 80 and discharge passage 81 for the test fluid. A spring 86 is positioned within enlarged diameter bore portion 64 and acts against flange 76 to continuously urge plunger 72 and valve 80 to an unseated position as shown in FIGS. 2 and 3.

As shown in FIG. 3, with test valve 42 shown in an open position without the source of any alternate test fluid connected thereto, an end cap indicated at 88 has external screw threads 90 engaging internal screw threads 70 of housing 56. Cap 88 has a central opening 92 therein and internal screw threads 94 adjacent its lower end. An end plug 96 having external screw threads 98 adjacent its inner end is threaded within opening 92 and has a central bore 100 therethrough for the passage of any fluid which might leak past O-ring 84. An O-ring 102 is arranged between end cap 88 and housing 56.

In the event it is desired to test pilot valves 30 and 32, end plug 96 is removed from end cap 88 and a hollow stinger indicated generally at 104 having an inner threaded end 106 is threaded within end cap 88 and engages the outer end surface of flange 76 on plunger 72 as shown in FIG. 2. Stinger 104 has an inner bore portion 108 and an outer bore portion 110. An inlet passage 112 is provided adjacent an end of inner bore 108 and an outlet passage 114 is provided adjacent an end of outer bore 110. Suitable O-ring seals 116 are provided adjacent passages 112 and 114. An annular O-ring 118 is provided between inner end 106 and end cap 88 to seal therebetween. A slidable sleeve 120, which may be manually gripped, has an annular seal 122 thereon, and an enlarged diameter portion 124 which may be selectively positioned in fluid communication with inlet passage 112 and outlet passage 114 as illustrated in FIG. 4. A ring 126 adjacent the outer end of stinger 104 acts as an outer stop for sleeve 120. A nut 128 secured to stinger 104 is provided for rotating stinger 104 into its position and also acts as an inner stop for sleeve 120.

A suitable flexible hose indicated diagrammatically at 130 in FIG. 1 is connected to the outer end of stinger 104 and extends to a reservoir 132 providing the pressurized test fluid. A gauge 134 may be provided in flexible hose 130 to gauge the pressure therein. A hand lever may be provided for reservoir 132 for pressurizing the fluid therein and a suitable valve is connected to reservoir 132 to release or control the pressure of the alternate fluid source.

OPERATION

In operation, with the test valve as shown in FIG. 3, end plug 96 is first removed, then stinger 104 is inserted within opening 92 of end cap 88 and threaded into contact with plunger 72 to move plunger 72 to the position of FIG. 4 in which valve 80 is seated on valve seat 52 to block the flow of fluid from the primary fluid pressure source. In this position, sleeve 120 is moved to an open position in engagement with nut 128 as shown in FIG. 4 and the test fluid is supplied from reservoir 132 through bore 78 of plunger 72 and discharge passage 81 into valve chamber 50 and outlet passage 48. When valve 80 is seated on seat 52, annular seal 84 and discharge passage 81 are positioned within valve chamber 50 formed by the enlarged diameter inner end bore portion 66 of housing 56 and fluid may be easily supplied to outlet passage 48 for communicating with pilots 30 and 32 for testing thereof. A predetermined low pressure may be provided by checking gauge 134 and thus low pressure pilot 30 may be actuated. A predetermined high pressure may be provided by fluid pressure reservoir 132 to test high pressure pilot 32. After pilot valves 30 and 32 have been checked, stinger 104 is unthreaded from cap 88 and plunger 72 returns to the position shown in FIG. 2 under the bias of spring 86. After stinger 104 has been removed, end plug 96 may again be threaded within end cap 88 as shown in FIG. 3. In this position, sealing member 84 is in sealing contact with the adjacent surface formed by intermediate bore portion 68 and the primary fluid pressure source from inlet 46 is sealed from end bore portion 64 by sealing member 84. In the event of leakage of any fluid past sealing member seal 84, it is communicated to atmosphere by central bore 100 in end plug 96.

A serviceman normally moves from one safety system to another system and stinger 104 along with reservoir 132 and flexible hose 130 are portable and the serviceman carries this with him from one safety system to another. Thus, plunger 72 is automatically returned to the unseated position of valve 80 upon removal of stinger 104 and no separate action is required by the serviceman to reinstate or again provide fluid communication with the primary fluid pressure in flow line 10 after stinger 104 is removed.

Referring to FIG. 6, a separate embodiment of the test valve body 44A is illustrated in which an inlet passage indicated at 46A and an outlet passage indicated at 48A are provided at right angles to each other. A valve seat 52A has a valve element 80A seated thereon to block the flow of fluid between inlet passage 46A and outlet passage 48A. Test valve structure 42A functions in a manner identical to that of the embodiment shown in FIGS. 1-5.

What is claimed is:
1. A test valve structure for closing a first fluid pressure source acting on a valve means and communicating an alternate fluid pressure source to act on the valve means for testing the valve means comprising:
   a. a test valve for positioning between the first fluid pressure source and the valve means to be tested, said test valve including a body having fluid inlet and outlet passageways both passageways communicating with a valve chamber having a valve seat therein;

b. an elongated housing secured to said body and having a central bore therein in fluid communication with the valve chamber, said central bore having enlarged diameter inner and outer bore portions connected by a small diameter intermediate bore portion;

c. a plunger within the central bore having an end portion fitting closely within the small diameter intermediate bore portion and a valve member on its inner end within the enlarged diameter inner bore portion, said plunger being movable between a projected seated portion of the valve member on the valve seat within the valve chamber to block fluid flow between the inlet and outlet passageways and a retracted unseated position of the valve member permitting fluid flow between the inlet and outlet passageways;

d. a spring mounted within the upper bore portion and urging the plunger continuously into an unseated portion in which the flow of fluid is maintained between the inlet and outlet passageways through the valve chamber, said plunger having a fluid inlet passage adjacent its outer end and a discharge passage adjacent its inner end at the adjacent intermediate bore portion, and e. an annular sealing member about the plunger between the discharge passage and the valve member and sealing between the plunger and the intermediate bore portion in the retracted position of the plunger, said annular sealing member and said discharge passage being positioned within the inner enlarged diameter bore portion when the valve member is seated in projected position of the plunger.

2. A test valve structure as defined in claim 1 wherein said annular sealing member is an elastomeric O-ring and fits in a groove about the circumference of the plunger.

3. A test valve structure for closing a first fluid pressure source acting on a valve means and communicating an alternate fluid pressure source to act on the valve means for testing the valve means comprising:

a. a test valve for positioning between the first fluid pressure source and the valve means to be tested, said test valve including a body having a first fluid inlet passageway for the first fluid pressure source and a second fluid outlet passageway for the valve means both passageways communicating with a valve chamber therebetween, an elongated housing secured to said body and having a central bore therein in fluid communication with the valve chamber, said central bore having enlarged diameter inner and outer bore portions connected by a small diameter intermediate bore portion, a plunger mounted for longitudinal movement within the central bore and having an end portion thereon fitting closely within the small diameter intermediate bore portion and extending inwardly into the enlarged diameter inner bore portion, said plunger end portion having a valve member on its inner end for seating on a valve seat within the valve chamber to block the fluid flow from the first fluid inlet passageway and the first fluid pressure source, a spring mounted within the upper bore portion and urging the plunger continuously into an unseated retracted position in which the flow of fluid is maintained between the first passageway and the second passageway through the valve chamber, said plunger having a fluid inlet passage adjacent its outer end and a discharge passage adjacent its inner end at the adjacent intermediate bore portion in the retracted position of the plunger, an annular sealing member about the plunger between the discharge passage and the valve member and sealing between the plunger and the intermediate bore portion at the retracted position of the plunger, and a hollow stinger means engaged in the housing bore for moving the plunger against the bias of the spring until the valve member seats on the valve seat within the chamber thereby to close off the first fluid pressure source, said annular sealing member and said discharge passage being positioned within the inner enlarged diameter bore portion when the valve member is seated, said stinger including means thereon for connecting with an alternate pressure source for supplying test fluid pressure through the housing bore and the laterally extending passage to the second fluid passageway.

4. The test valve structure defined in claim 3 wherein said stinger has a first fluid passageway and a second fluid passageway, and an external sleeve is mounted for manual sliding movement on said stinger between two positions, said sleeve having a connecting fluid chamber therein providing fluid communication between the first and second fluid passageways in one position and preventing fluid communication between the first and second fluid passageways in the other position.

* * * * *